Oct. 1, 1940.  C. H. FETTER  2,216,512
PHOTOGRAPHIC PROJECTION DEVICE
Filed Nov. 10, 1937  3 Sheets-Sheet 1
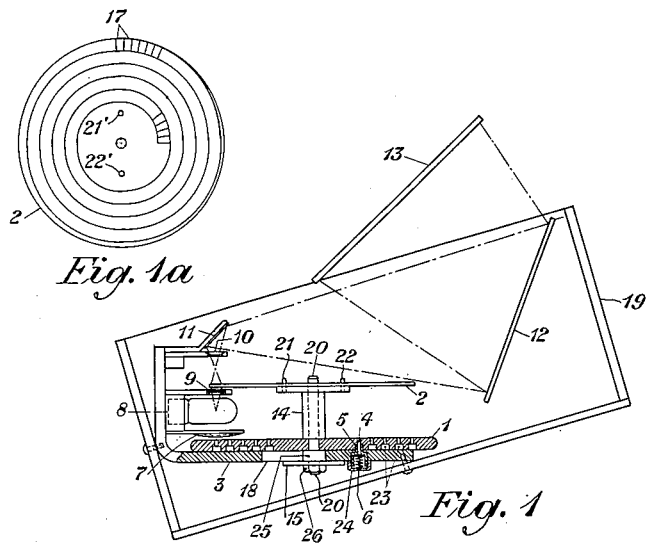
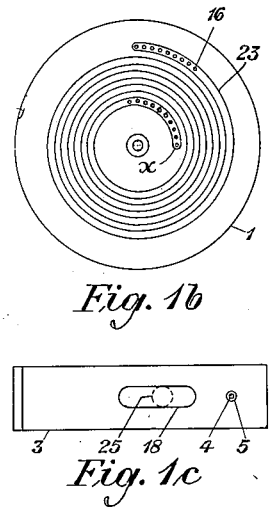
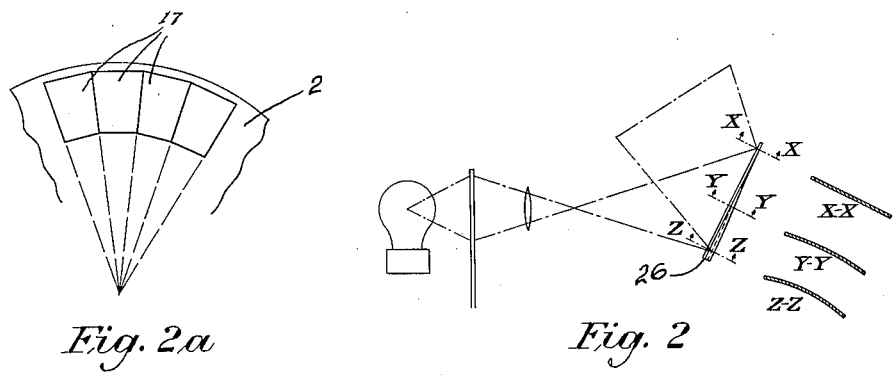
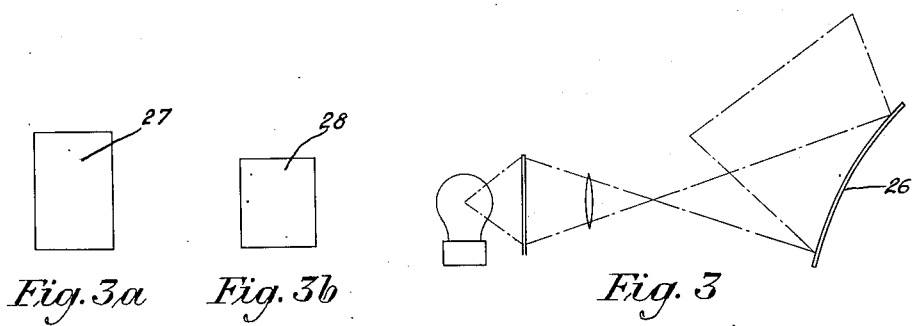
INVENTOR
Charles H. Fetter
BY
ATTORNEY Oct. 1, 1940.  C. H. FETTER  2,216,512
PHOTOGRAPHIC PROJECTION DEVICE
Filed Nov. 10, 1937   3 Sheets-Sheet 2

INVENTOR
Charles H. Fetter
BY
ATTORNEY

INVENTOR
Charles H. Fetter
BY
ATTORNEY

Patented Oct. 1, 1940

2,216,512

UNITED STATES PATENT OFFICE 2,216,512

PHOTOGRAPHIC PROJECTION DEVICE

Charles H. Fetter, Maplewood, N. J.

Application November 10, 1937, Serial No. 173,741

5 Claims. (Cl. 88—27)

This invention relates to the art of reproducing upon a screen the image appearing upon a photographic plate or film or other translucent medium.

One of the objects of the present invention is to reproduce upon a screen the subject matter appearing upon a microphotograph, the reproduction being enlarged to the degree required to present the subject matter clearly to the eye of the user of the apparatus. For the purpose of this disclosure it is assumed that the printed matter projected upon a screen is shown in the form of white letters upon a black background, the opposite of the conventional printed page, in order to avoid excessive glare. Hence the microphotograph is termed a negative, and, in the description that hereinafter follows, that term means a developed film or plate in which the background is relatively opaque and the letters are relatively transparent.

Another object of the invention is to automatically bring the microphotographs in succession into the proper position between the light source and the lens of the projection apparatus so as to ensure the proper delineation upon the screen of the subject matter upon said microphotograph; and to hold the record, that is, plate or film, fixedly in such position until it is desired to move the said record, such movement corresponding to the turning of the pages of a book.

A further object of the invention is to correct the distortion that is purposely introduced during the process of "keystoning" a sequence of exposures upon a photographic negative, so that the reproduction of the subject matter of such exposure will appear upon the screen in rectangular form; or to correct any distortion, such, for example, as when the negative is designedly foreshortened.

Another object of this invention is to provide a means for quickly and easily referring to a particular microphotograph, (which may be one of a large group upon a plate) by page number which provides a convenient method of preindexing the photographs of a book or a group of photographs without the necessity of "running through" a long sequence of photographs to obtain the one desired.

Figure 4:
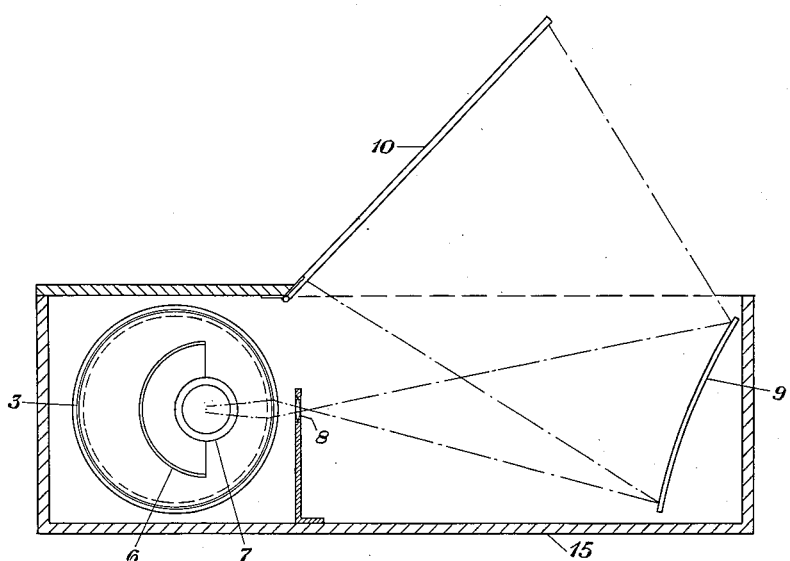

Other objects of this invention will be apparent from the following description when read in connection with the attached drawings of which Fig. 1 shows a type of projector adapted to use the flat, circular type of negative that is made by the process described in the copending application of Fetter, Serial No. 173,742, filed Nov. 10, 1937; Fig. 1a shows a negative plate upon which the successive exposures have been "keystoned" and arranged in spiral form; Fig. 1b shows the disk having the spiral groove and holes by which the successive views upon the photographic plate of Fig. 1 are brought into the correct position between the light source and lens of the projection apparatus; and Fig. 1c is the mounting plate for supporting the apparatus; Figs. 2 and 2a show means for eliminating from the screen the effect of distortion due to keystoning and Figs. 3, 3a and 3b show, in similar fashion, means to eliminate another form of predistortion; Fig. 4 shows a type of projector to be used when the microphotographic record is cylindrical in form (instead of a flat disc as in Fig. 1); Figs. 4a, 4b, 4c and 4d show details of the apparatus of Fig. 4; and Figs. 5, 5a and 5b show several views of a projector in which a particular picture, which is one of a large group, may be quickly found and brought into position for projection upon the screen.

In the arrangement shown in Fig. 1, a mounting plate 3 is placed at an angle, across the end of a box 19 within which or affixed to which are mirrors and a screen and other apparatus that unitedly form the projection device. The plate 3 has therein a slot 18 in which rests the member 25, the diameter of which, as shown in Fig. 1c, is substantially the same as the width of the slot. The member 25 and also the record support bracket 14 are secured to or may be an integral part of the disc 1. A bolt 20 passes through the bracket 14 and member 25 and has a nut 26 at the lower end with a plate 15 between the nut and the bottom of the mounting plate 3. The said bracket has at its upper end two pins, 21 and 22, that will fit into corresponding holes, 21' and 22', in the photograph record, shown in Fig. 1a, when the said record is placed upon the support bracket 14. The upper end of the bolt 20 may be so designed and proportioned as to engage the central hole in said record, thereby facilitating the mounting of the said record upon the said bracket. If desired a suitable lock nut or pin may be employed to keep the nut 26 in position. Other ways for securing the disc and bracket to the mounting plate, without impairing the rotatability of the said disc and bracket, may be employed without departing from the spirit and scope of the invention.

The spiral-drive and register disc 1, as shown in cross-section in Fig. 1 and in plan in Fig. 1b, has in its lower face a spiral groove 23 and in the bottom of said groove will be found a series of holes. Those holes are adapted to be engaged by a pin 4, shown in Fig. 1, which is pressed upwardly by the force of a spring 6 all of which is contained within a shell 24 that is screwed or otherwise fastened to the mounting plate 3. The pin 4 is of sufficient length to project into the holes at the bottom of the groove 23, under pressure of the spring 6. The pin 4 is centered within another pin 5 which, however, is fixed, and serves as a pivot by means of which the spiralled member 1 is given longitudinal movement, the manner and the effect of which will be clear from subsequent description.

The optical features of the apparatus include a source of light 8 inserted between the reflector 7 and a filter 9, above which will pass, in sequence, the microphotographs upon the negative plate 2, the successive photographs being correctly positioned by the coaction of the apparatus hereinbefore described. The filter 9 may be an optical filter, such as a color filter, or may be composed of light polarizing material for the purpose of obtaining an optimum reading condition, including the elimination of direct light or glare. A lens 10, fixed above the plate, serves to focus the beam upon the mirror 11 which is fixed at such an angle as to reflect the image upon a second, and larger mirror 12 by which the image is projected upon a screen 13, which may be of any suitable material.

The manner in which the apparatus operates is as follows: The spiral drive and register disc 1, a small segment of which extends through a slot in the side of the box 19, may be moved by pressing with the thumb and fingers against the said segment. The edge of the disc may be corrugated in order to facilitate its movement. The movement is continued until the pin 4 drops into the first hole at the inner end of the spiral groove of the said disc. When that occurs, the first of the sequence of negatives at the outer end of the spiral will automatically be correctly positioned between the filter 9 and the lens 10 of the optical system of the projector. The image of the negative, appearing in the mirror 11 will be reflected upon the mirror 12, and, in turn, upon the screen 13. During the process of projection, the image, which is of micro-proportions upon the negative, becomes greatly enlarged, so that, if the negative represents a page of printed matter, the image on the screen may be easily read by the user of the apparatus. When such user has finished reading the page upon the screen he may turn to the next page by rotating the disc 1 until the pin 4 drops into the next succeeding hole in the groove 23. This automatically brings the next succeeding negative upon the photographic record 2 in proper alignment with the lens of the optical system so that the next page of the photographically recorded book will appear on the screen. By carrying out the process just described each succeeding page of the negative will be distinctly projected upon the screen.

The manner in which the individual negatives upon the plate 2 are automatically aligned between the lamp and the lens 10 is as follows: Since the grooved disc 1, the bracket 14 and the negative plate thereon constitute, in effect a rigid structure, any motion of the disc will produce a corresponding motion of the negative plate. In Fig. 1 the disc 1 is shown in its extreme position toward the right, the pin 5 being at the inner end of the said groove (indicated by X upon Fig. 1b of the drawings) and the member 25 is at the right hand end of that slot. The member 25, the plate 15 and the bolt 26 together serve as a movable axis for the disc 1 and the support 14. Obviously, as the disc 1 is rotated, the conjoint action of the groove 23 and the pin 5 causes, at the same time, a longitudinal movement, toward the left, of the disc 1, together with everything attached thereto, namely the bracket 14 and the negative plate 2. In that manner each individual negative is brought, in succession between the lamp and the lens and is correctly registered therebetween, with the result that the matter upon the negative is properly displayed on the screen. This is due to the fact that the curvature of the spiral groove is the same as the curvature of the negatives upon the negative plate 2.

The manner in which the effect produced by the distortion of the negative may be counteracted and neutralized is shown in Figs. 2, 2a, 3, 3a and 3b, which are concerned with two typical forms of distortion. In order to obtain the most efficient use of a circular plate, the individual negatives 17 thereon are keystoned, as in Fig. 2a, the lower edges being shorter than the upper with the resultant effect that the angles are not right angles. Obviously, the image appearing upon the screen of such a negative would be similarly distorted unless positive means were adopted to correct such distortion during projection. The corrective means, as shown in Fig. 2, consists in a special mirror 26, flat at its upper edge but bending with increasing curvature toward the bottom, as is clearly indicated by the longitudinal cross sections shown at the right of Fig. 2. The top section X—X is substantially flat, whereas the section Y—Y near the midpoint is slightly curved, and the section Z—Z at the bottom of the mirror is considerably curved. The result is that the picture appearing upon the screen will have rectangular form, free from distortion. The optical system is, in other respects, similar to that shown in detail in Fig. 1.

If it is desired to foreshorten the individual negative 27, shown in Fig. 3b, in order to conserve space upon the master negative, with the result that the negative will be considerably shorter than the normal size negative, as shown by 28 in Fig. 3a, the distortion arising from the use of such a fore-shortened negative may be neutralized by the use of a curved mirror 29 as shown in Fig. 3, so that the image upon the screen will have the proportions as in Fig. 3a. The optical system of Fig. 3 is, in other respects, similar to that shown in detail in Fig. 1.

The types of projectors hereinbefore described have been designed for use with negative records having the form of flat circular discs. Since it is practicable, and, in some instances, may be desirable to arrange the individual negatives in spiral form around a hollow cylinder of some translucent material, a type of projector for handling such a type of negative is shown in Figs. 4, 4a, 4b, 4c and 4d.

As shown in Fig. 4, there is enclosed within the box 15 a source of light 7, e. g. an electric lamp of relatively great light intensity, having behind it a reflecting surface 6, which projects the light through negatives upon a record supported by the cylinder 3. The beam of light passes through the lens 8 to the mirror 9, the image being magnified by the said lens, as indicated by the dotted lines. By the mirror 9, the image is reflected upon a screen 10, the distortion arising from the curved surface of the cylinder 3 being eliminated from the screen by the use of a curved mirror at 9. A suitable filter may be provided as in Fig. 1.

Figure 4A:
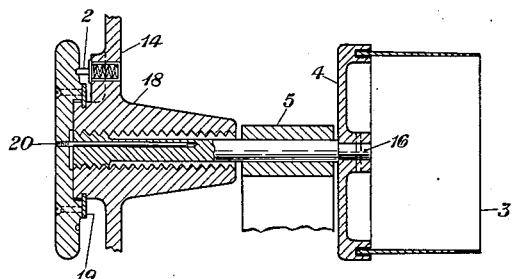
Figures 4B, 4C:
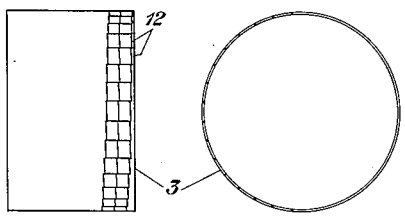
Figure 4D:
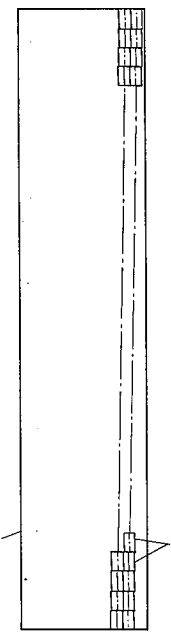
Figure 5:
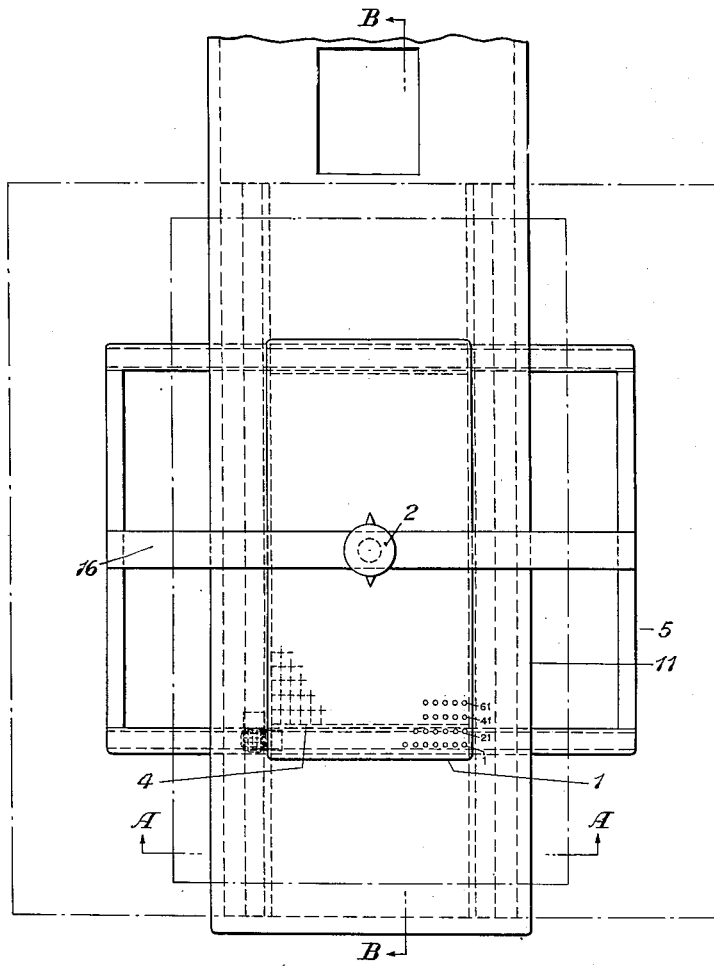
Figure 5B:
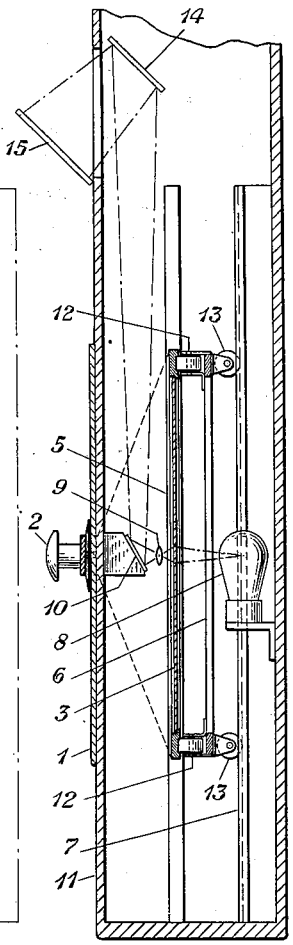
Figure 5A:
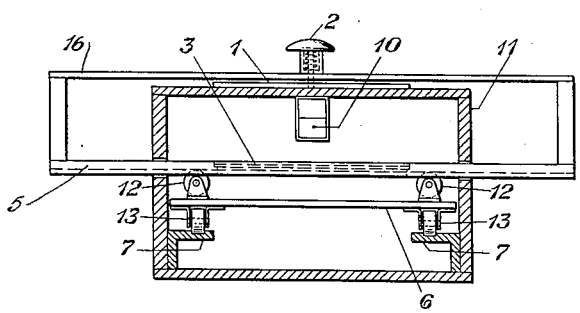

The cylindrical negative 3 is supported by the mechanism shown in detail in Fig. 4a, which is designed to bring the successive individual negatives in proper position between the lamp 7 and the lens 8, and also to hold the cylinder fixed at any given position, thus performing the same function as the drive and register disc of Fig. 1. In Fig. 4a, the translucent cylinder 3 is supported by the mounting bracket 4 which is rigidly attached to and mounted upon the shaft 16. The shaft is supported by the bearing 5. As shown in Fig. 4a, the left hand end of the shaft is threaded for a short distance from that end, and the threaded portion engages the internal thread upon the member 18. The hand wheel is rotatably supported by the ring 19. Affixed to the said wheel, but in an eccentric position is a long pin 20 which fits into a hole within the threaded end of the shaft 16. The bearing member 14 has within a recess thereof a spring actuated pin 2 which is positioned to engage in sequence each of a series of holes in the hand wheel. The film, as shown, in side view, in Fig. 4b and in development in Fig. 4d, carries a plurality of individual, microphotographic negatives, each succeeding one being slightly staggered with respect to the preceding one, so as to follow a spiral course around the cylindrical film as shown clearly in the said figures.

When the user of the apparatus wants to read the photographic book, he will place the cylindrical film over the translucent cylinder 3 carried by the bracket 4, the said film having therein a notch to mesh with a pin on the cylinder 3 to ensure proper registration of the individual negatives and the holes in the hand wheel of member 1. The first negative is thus properly registered and when the lamp 7 is lighted the page of the first individual micro-negative will be projected upon the screen 10. When the reader desires to turn a page he will rotate the hand wheel 1 which will simultaneously turn the cylinder 3 (and the film carried thereby) and will, at the same time draw the cylinder to the left so that the next succeeding negative, which is staggered with respect to the preceding one next succeeding will be properly positioned between the lamp 7 and the lens 8. The negative will be properly centered whenever the pin 2 clicks as it falls into the corresponding hole of the hand wheel 1, so that all the reader has to do is to listen for or feel the click. The registration of each individual negative thus becomes automatic.

By means of this invention it is possible for a reader to read with great ease the "books" that are photographicaly printed upon the negative records, of relatively small size, the mechanism requiring but slight attention to attain perfect reproduction of the picture, that is, the printed page, upon the negative record.

The projector shown in Figs. 5, 5a and 5b is characterized by the ability to quickly bring into position between the lamp and the lens a particular picture from a vast number that may be upon a master negative. The negative record 3, upon which has been photographed a plurality of micro-negatives as shown by 4 of Fig. 5, is held in horizontal position by a frame 5 which is supported by two pairs of rollers, 12, one pair being shown in Fig. 5a and one roller of both pairs being shown in Fig. 5b. Fastened to the upper surface of a bracket 16, supported by the frame 5, is a spring-latch having a knob and a pin 2 which normally is pressed downward by the action of the said spring so as to engage one of a plurality of holes in the index plate 1 which is fixedly attached to the upper surface of the box 11 over which the bracket 16 extends. The sides of the said box are slotted to permit the transverse and longitudinal movement of the frame 5. The said index plate has in it as many holes as there are individual negatives upon the plate and each hole occupies the same position on the index plate as its corresponding negative occupies upon the master negative record. The rollers 12, 12 are supported upon another frame 6 which, in turn, is supported by the rollers 13, 13 that move in the tracks 7, 7. Regarding Fig. 5a, it will be seen that the rollers 12, 12 are positioned so that the frame 5 is permitted to move from right to left and vice versa; whereas the rollers 13, 13 move in the tracks 7, 7 away from or toward the observer, so that the frame 6 is capable of similar motion. Since the frame 5 is supported upon frame 6, frame 5 is capable of movement in four directions. The box 11 contains a lamp 8 that projects a beam of light through the master record 3 and the lens 9 onto a mirror 10; whence it is reflected onto a mirror 14 and, in turn, upon a screen 15.

When the observer wants to project a particular negative upon the screen, he withdraws the pin by pulling upward upon the knob 2 and then moves the frame 5 to left or right, as may be desired, and also frame 6 upwards or downwards, if necessary to bring the pin over the hole in the index-plate 1 that corresponds to the desired individual negative upon the master record 3. The dropping of the pin into that hole guarantees proper registration of the desired negative between the lamp and the lens, which form the optical axis of the system, provided, of course that the master negative has been properly inserted in its place upon the frame 5, beneath the index plate.

While the invention has been disclosed as embodied in particular forms and arrangements of parts, it is, obviously, capable of embodiment in other and different forms without departing from the spirit and scope of the appended claims.

What is claimed is:

1. A device for enlarging and projecting upon a screen a picture constituting one of a group of negative or positive microphotographs upon a translucent plate or film, comprising an optical system including a lens and a source of light forming the optical axis, a mirror or a system of mirrors and a screen in combination with a carriage to move the said group of photographs across the said optical axis, the said carriage comprising a frame for supporting said photographs, the frame being adapted to move in a plane perpendicular to the said optical axis, a second frame having means to movably support the said first movable frame, a box having means to movably support said second frame, the said frames being parallel and the direction of motion of one frame being at a right angle to that of the other.

2. A picture projector comprising an optical system in which a beam of light is focussed by a lens upon a mirror and is reflected thereby upon a screen, either directly or from a second mirror, and means to bring into registration with the optical axis of the system any one of a group of positive or negative microphotographs, the said means comprising a movable frame rotatably supported by a second movable frame, the planes of said frames being substantially parallel, their direction of motion being at right angles to each other and both being perpendicular to the optical axis, a box adapted to movably support said second frame, a perforated guide-plate attached to the said box, each perforation corresponding in position to one of said photographs upon said first frame and a pin supported by a bracket attached to said first frame, the said pin being intended for insertion in one of said perforations whereby the photograph corresponding to that perforation will be brought into registration with the optical axis and the corresponding picture will be displayed upon said screen.

3. In a device adapted to project upon a screen each of a plurality of images appearing upon a photographic plate or film the combination with an upper frame adapted to support said photographic plate or film, of a lower frame supporting a plurality of rollers upon which the said first frame rests, the said lower horizontal frame also being supported by a plurality of rollers, both frames being adapted to move in parallel, horizontal planes, the upper frame being capable of motion at a right angle to that of the lower frame, and a box having guides therein adapted to support the rollers upon which the said lower frame rests, the said box having upon its top a perforated index plate, the said perforations being numbered and each perforation corresponding to a similarly numbered image upon said plate or film, the said index plate being so positioned that the said perforations may be engaged by a pin, removable at will, supported by a bracket carried by the said upper frame.

4. A picture projector having an optical system including a source of light, a lens, or a system of lenses, a mirror or a system of mirrors, and a screen, and means to bring into registration with the optical axis of said system a selected picture from a group of positive or negative microphotographs, the said means including a frame for supporting the group of photographs, a second frame having means connected therewith for movably supporting said first frame, a box having means for movably supporting said second frame, both frames lying in parallel planes and the direction of motion of one being at a right angle to that of the other, and the planes of the said frames being perpendicular to the optical axis of the said projector, and means supported by said box and coacting with means supported by said first frame to hold the said frame in any position relative to the said box.

5. A picture projector adapted to move any one of a group of micropositive or negative pictures, arranged in sequence upon a frame, into registration with the optical axis of the projector, without runing through the entire sequence of such pictures, and to project the selected picture upon a screen, comprising a frame adapted to support said group of pictures, a second frame parallel to said first frame and separated therefrom, the said first frame being movably supported by the said second frame, a box adapted to movably support said second frame and to permit it to move in a direction at right angles to the direction of motion of said first frame, the side walls of said box being slotted to permit the lateral and longitudinal movement of the said first frame within the said box, a guide-plate attached to the top of the said box having therein a plurality of perforations, each perforation corresponding to one of said microphotographs, and a pin, supported by a bracket carried by said first frame, adapted to be inserted in each of said perforations, the perforations being so related to said group of microphotographs that when the pin is in a given perforation the picture corresponding thereto will be in registration with the optical axis of the said projector which is perpendicular to the planes of the said frames.

CHARLES H. FETTER.